United States Patent [19]
Daum et al.

[11] Patent Number: 6,013,692
[45] Date of Patent: Jan. 11, 2000

[54] CELLULAR POLYURETHANE ELASTOMERS

[75] Inventors: Ulrich Daum, Hofstetten; Arno Feeken, Buxtehude; Wolfgang Jarre, Bad Oldesloe; Andreas Schmidt, Reinach; Reinhard Sklenarz, Garlstorf, all of Germany

[73] Assignee: Lonza AG, Gampel/Valais, Switzerland

[21] Appl. No.: 09/091,108

[22] PCT Filed: Dec. 11, 1996

[86] PCT No.: PCT/EP96/05542

§ 371 Date: Dec. 17, 1998

§ 102(e) Date: Dec. 17, 1998

[87] PCT Pub. No.: WO97/21749

PCT Pub. Date: Jun. 19, 1997

[30] Foreign Application Priority Data

Dec. 12, 1995 [SE] Sweden ................................. 03504/95
Apr. 23, 1996 [SE] Sweden ................................. 1027/96

[51] Int. Cl.⁷ .................................................. C08G 18/04
[52] U.S. Cl. .......................... 521/155; 521/159; 521/163; 521/170
[58] Field of Search .................... 521/155, 163, 521/159, 170

[56] References Cited

U.S. PATENT DOCUMENTS 3,523,918  8/1970  Gonzalez .
3,752,790  8/1973  McShane, Jr. et al. .
4,950,792  8/1990  Althaus et al. .
5,026,815  6/1991  Volker et al. .

FOREIGN PATENT DOCUMENTS 0220641   10/1986  European Pat. Off. .
0387984    3/1990  European Pat. Off. .
1448751    7/1964  France .
WO 97/21749  6/1997  WIPO .

OTHER PUBLICATIONS

PCT Request in PCT/EP96/05542 (1996).
Notice Informing The Applicant Of Communication Of The International Application To The Designated Offices (1996).

*Primary Examiner*—John M. Cooney, Jr.
*Attorney, Agent, or Firm*—Fisher, Christen & Sabol

[57] ABSTRACT

Cellular Polyurethane elastomer which is produced by reacting:

(a) an isocyanate component which includes methylenebis(phenyl isocyanate) (MDI) and/or tolylene diisocyante (TDI), in monomeric form or as liquefied prepolymer with (b) compounds which at least two isocyanate-reactive hydrogen atoms and (c) 4,4'-methylenebis(3-chloro-2,6-dialylaniline) or a mixture of 4,4'-methylenebis-(3-chloro-2,6-dialyaniline) with one or more aromatic, aliphatic or cycloaliphatic diamines as chain extending agent, if desired with further polyol, and (d) a blowing agent in the presence of the usual catalysts and, if desired, other additives.

12 Claims, No Drawings

CELLULAR POLYURETHANE ELASTOMERS

BACKGROUND OF THE INVENTION

1. Field of the Invention

The invention relates to cellular polyurethane elastomers, in particular those which can be subjected to high dynamic stresses.

2. Background Art

High requirements are placed upon the materials of cellular polyurethane elastomers applied, for example, in passenger or freight vehicle springing systems or in buffer and bumper systems subject to high dynamic stresses. Cellular polyurethane elastomers based on methylenebis-(phenyl isocyanate) (MDI) or tolylene diisocyanate (TDI) have hitherto not been able to fulfil these high requirements and have therefore so far been used for applications subject to lower dynamic stresses. The chain extending agents used in these systems are usually glycols, in particular butanediols. The resultant hard polyurethane segments have a melting range from about 180° to 200° C., and for cases of high dynamic or thermal stress this markedly impairs the mechanical properties of the products produced therefrom. The standard for applications involving high dynamic stresses has hitherto been cellular polyurethane elastomers based on naphthylene diisocyanate (NDI) and known as "Vulkollan". These cellular polyurethane elastomers show good behavior under dynamic stress, but they have the disadvantage that the prepolymers are not stable when stored (cf. Kunststoff Taschenbuch [Plastics Handbook], 24th edition, Carl Hanser Verlag, Munich, 1989, pp. 436ff.). The consequence for the final producer is therefore that only in-line production is possible, the prepolymer being converted immediately into the finished part. NDI-containing products also differ from industrially produced MDI products in having a significantly higher price level.

BROAD DESCRIPTION OF THE INVENTION

It was therefore the object of the invention to develop cellular polyurethane elastomers which utilize the advantageous properties of methylenebis(phenyl isocyanate) (MDI) and tolylene diisocyanate (TDI) with respect to storage capability of the prepolymers and to availability and advantageous price, and which in their material properties achieve the requirements for applications involving high dynamic stresses.

The object was achieved with cellular polyurethane elastomers according to of the invention.

According to the invention, the cellular polyurethane elastomer may be produced by reacting a) an isocyanate component which includes methylenebis(phenyl isocyanate) (MDI) and/or tolylene diisocyanate (TDI), in monomeric form or as liquefied prepolymer with b) compounds with at least two isocyanate-reactive hydrogen atoms and c) 4,4'-methylenebis(3-chloro-2,6-dialkylaniline) or a mixture of 4,4'-methylenebis(3-chloro-2,6-dialkylaniline) with one or more aromatic, aliphatic or cycloaliphatic diamines as chain extending agent, if desired with further polyol, and d) a blowing agent and, if desired, in the presence of the usual catalysts and other additives.

The isocyanate component MDI is generally monomeric 4,4'-methylenebis(phenyl isocyanate) or pre-polymers thereof liquefied with small proportions of polyol. However, this term also includes an MDI which expediently contains proportions of up to 30% by weight of the isomeric 2,4'-methylenebis(phenyl isocyanate). Mixtures of MDI with other polyisocyanates, for example with tolylene diisocyanate (TDI) or with other industrially obtainable diisocyanates, for example hexamethylene diisocyanate or isophorone diisocyanate, are likewise included in this term. It is, however, also possible to obtain commercially, and use, the MDI in the form of a prepolymer with a particular NCO content, for example under the name Vibrathane®.

The tolylene diisocyanate is generally either the isomerically pure 2,4- or 2,6-isomer or any desired mixture of these isomers with one another. An isomer mixture of the 2,4- and 2,6-isomers in a ratio of 80:20 or 65:35 is, for example, known and obtainable in industrial quantities. It is, however, also possible to obtain commercially, and use, the TDI in the form of a prepolymer with a particular NCO content, for example under the name Vibrathane®.

Examples of suitable compounds with at least two polyisocyanate-reactive hydrogen atoms are in particular polyols, for example polyether polyols, polyester polyols or other polyols (e.g. polycaprolactones) with a molecular weight range of from 500 to 10,000, preferably from 800 to 5000. Examples listed are the polytetramethylene ether glycols marketed under the trade mark Terathane® (Du Pont), the polyether polyols marketed under the trade mark Acclaim® (Arco), the polyester diols marketed under the trade mark Daltorez® (ICI) or Desmophen® (Bayer) or the polyols containing carbonate groups and marketed under the designation PolyTHF/CD(BASF).

It is expedient for the alkyl group in the 4,4'-methylenebis(3-chloro-2,6-dialkylaniline) to be a methyl, ethyl, n-propyl, isopropyl, n-butyl, isobutyl or tert-butyl group, but particularly preferably an ethyl group. The preparation of these 4,4'-methylenebis(3-chloro-2,6-dialkylanilines) used as chain extending agents is described in detail in European Patent No. 220,541. The 4,4'-methylenebis(3-chloro-2,6-dialkylaniline) may be used either alone or as a constituent of a mixture with other aromatic, aliphatic or cycloaliphatic amines, for example with the known compounds MOCA, dimethylthio-toluenediamine or with triamines or diamines based on polypropylene glycol. The chain extending agent is advantageously used together with a polyol. Suitable polyols here are those mentioned above, for example polyether polyols, polyester polyols or other polyols (e.g. polycaprolactones) with a molecular weight range of from 500 to 10,000, preferably from 800 to 5000. The polyol component is expediently used in a molar ratio, based on the chain extending agent, of from 0.1 to 10, preferably from 0.5 to 5.

The blowing agent used is preferably water or a commercially available water-based blowing agent with added dispersing agent, for example Bayer's SM® blowing agent. However, it is also possible to use other, or under some circumstances additional, blowing agents, e.g. blowing agents with a physical action and based on hydrocarbons or else halogenated hydrocarbons. The blowing agent is expediently used in amounts of from 0.1 to 9 mol, based on 1 mol of chain extending agent.

It is also possible to use the usual catalysts, for example tetramethylbutanediamine (TMBDA), diazabicyclooctane (DABCO), dibutyltin dilaurate (DBTC) or organic heavy metal compounds, individually or in combinations. Examples of usual additives are plasticizers, stabilizers, flame retardants and fillers (cf., for example, Kunststoff Taschenbuch [Plastics Handbook], 24th edition, Carl Hanser Verlag, Munich, 1989, p. 430).

The components may expediently be processed via the one-shot process or the prepolymer process, preferably via the prepolymer process (cf. for example, Kunststoff Taschenbuch [Plastics Handbook], 24th edition, Carl Hanser Verlag, Munich, 1989, pp. 429 ff.).

In the prepolymer process it is expedient to react the components a) methylenebis(phenyl isocyanate) (MDI) or tolylene diisocyanate (TDI) with the component b) compounds with at least two isocyanate-reactive hydrogen atoms to give a prepolymer which has a content of from 2 to 28% by weight of free isocyanate groups.

MDI and TDI prepolymers are available commercially with various NCO contents, for example under the trade mark Vibrathane® (Uniroyal).

The "polyol component" is expediently composed of the component c) 4,4'-methylenebis(3-chloro-2,6-dialkylaniline) or a mixture of 4,4'-methylenebis(3-chloro-2,6-dialkylaniline) with one or more aromatic, aliphatic or cycloaliphatic diamines as chain extending agent and d) the blowing agent and, if desired, the usual catalysts and other additives.

In the one-shot process, it is expedient to react the "isocyanate component"

a) methylenebis(phenyl isocyanate) (MDI) (modified, if desired, with small amounts of a polyol in such a way that a liquid component is produced at low temperatures) or tolylene diisocyanate (TDI) with the "polyol component" composed expediently of the components b) compounds with at least two isocyanate-reactive hydrogen atoms a prepolymer is prepared [lacuna] which has a content of from 2 to 30% by weight of free isocyanate groups.

c) 4,4'-methylenebis(3-chloro-2,6-dialkylaniline) or a mixture of 4,4'-methylenebis(3-chloro-2,6-dialkylaniline) with one or more aromatic, aliphatic or cycloaliphatic diamines as chain is extending agent and d) the blowing agent and, if desired, the usual catalysts and other additives.

The processing of the prepolymer component or of the isocyanate component with the polyol component to give the cellular polyurethane elastomer takes place in a manner known, preferably in a casting process in closed molds (cf., for example, Kunststoff Taschenbuch [Plastics Handbook], 24th edition, Carl Hanser Verlag, Munich, 1989, pp. 436ff.). The cellular polyurethane elastomers produced according to the invention are distinguished by high dynamic stress resistance and heat resistance and are therefore particularly suitable for use in moldings subject to high dynamic stresses and in systems for the decoupling of vibrations in motor vehicles and machines. Examples are resilient elements in shock absorbers for passenger or freight vehicles or buffer and bumper systems.

DETAILED DESCRIPTION OF THE INVENTION

EXAMPLES (MDI)

Prepolymer 1

1250 g (5 mol) of 4,4'-methylenebis(phenylisocyanate) (MDI) were melted at 60° C. and, with stirring and exclusion of atmospheric moisture, mixed within a period of 15 minutes with 1000 g (0.5 mol) of polycaprolactone (Capa® 225 from Interox) which had been melted at 60° C. Stirring was continued for a further hour at 80° C., giving 2250 g of a prepolymer which was liquid at 35° C. and had a NCO content of 16.8%.

Prepolymer 2

Commercially available Vibrathane® 8010 from Uniroyal. (MDI prepolymer with an NCO content of 9.26%).

Prepolymer 3

Commercially available Vibrathane® B625 from Uniroyal. (PTMEG-MDI prepolymer with an NCO content of 6.28%).

Polyol Component 1

2000 g (1 mol) of polycaprolactone diol (Capa® 220 from Interox) at 60° C. were mixed with 380 g (1 mol) of molten 4,4'-methylenebis(3-chloro-2,6-diethylaniline) (LONZACURE® MCDEA from LONZA AG). The following additions were then incorporated:

| | 27 g (1.5 mol) of water | |
|---|---|---|
| Catalysts: | 6 g of Dabco ® 1028 | (Air Products) |
| | 1 g of Dabco ® solid | (Air Products) |
| | 5 g of Dabco ® BL17 | (Air Products) |
| Cell stabilizer: | 20 g of LK221 | (Air Products) |

This gives a polyol/diamine/water component with an equivalent weight of 348.

Polyol Component 2

The 27 g (1.5 mol) of water in polyol component 1 were replaced by 36 g (1 mol) of SM® (50% strength water/sulphonate mixture from Bayer, Leverkusen). The formulation remaining otherwise identical, this gives a polyol/diamine/water mixture with an equivalent weight of 406.

Polyol Component 3

2000 g (1 mol) of polyester diol (Daltorez® P720 from ICI) at 60° C. were mixed with 380 g (1 mol) of molten 4,4'-methylenebis(3-chloro-2,6-diethylaniline/LONZACURE® MCDEA, LONZA AG). The following additions were then incorporated:

| 54 g (1.5 mol) of SM ® | (Bayer Leverkusen) |
|---|---|
| 6 g of Dabco ® 1028 | (Air Products) |
| 2.4 g of Dabco ® solid | (Air Products) |
| 5 g of Dabco ® BL17 | (Air Products) |
| 2 g of LK221 | (Air Products) |

This gives a polyol/diamine/water component with an equivalent weight of 350.

Polyol Component 4

In polyol component 3, instead of 380 g (1 mol) of 4,4'-methylenebis(3-chloro-2,6-diethylaniline), 570 g (1.5 mol) of this component were used. With a formulation which was otherwise identical, this gave a polyol/diamine/water mixture with an equivalent weight of 330.

Polyol Component 5

2000 g (1 mol) of polytetramethylene ether glycol (Terathane® 2000 from Du Pont) at 60° C. were mixed with 760 g (2 mol) of molten 4,4'-methylenebis (3-chloro-2,6-diethylaniline). The following additions were then incorporated:

| 90 g (2.5 mol) of SM ® | (Bayer Leverkusen) |
|---|---|
| 9 g of Dabco ® 1028 | (Air Products) |
| 3.5 g of Dabco ® solid | (Air Products) |

-continued

| | |
|---|---|
| 15 g of Dabco ® BL17 | (Air Products) |
| 3.5 g of LK221 | (Air Products) |

This gives a polyol/diamine/water component with an equivalent weight of 262.

Polyol Component 6 (comparison)

2000 g (1 mol) of polycaprolactone diol (Capa® 225 from Interox) at 60° C. were mixed with 180 g (2 mol) of 1,4-butanediol. The following additions were then incorporated:

| 13.5 g (0.75 mol) of water | |
|---|---|
| 6 g of Dabco ® 1028 | (Air Products) |
| 1 g of Dabco ® solid | (Air Products) |
| 5 g of Dabco ® BL17 | (Air Products) |
| 20 g of LK221 | (Air Products) |

This gives a polyol/diamine/water component with an equivalent weight of 297.

Production of Test Sheets:

| | |
|---|---|
| Low-pressure PU machine | Type PS 4 from LIM |
| Output: | 2.5 kg/minute |
| Component temperatures: | 35° C. (prepolymer) |
| | 50° C. (polyol component) |
| Mould temperature: | 60° C. |
| Mould dimensions: | 200 × 200 × 10 mm |
| Processing: | Casting process |

Testing after 7 days' storage under normal climatic conditions (26° C. and 50% relative humidity)

The test criteria measured was the difference (ΔDVR) in compression set, measured once at 70° C. and the second time at 80° C. Determination of compression set was based on DIN 53517 (specimen thickness 10 mm, 40% deformation).

Density was determined in accordance with DIN 53420.

Results:

| Example | Pre-polymer No. | Polyol component No. | Density kg/m$^3$ | ΔDVR % | |
|---|---|---|---|---|---|
| 1 | 1 | 1 | 550 | 3.7 | Invention |
| 2 | 1 | 2 | 550 | 5.6 | " |
| 3 | 2 | 3 | 500 | 8.0 | " |
| 4 | 2 | 4 | 530 | 3.0 | " |
| 5 | 3 | 5 | 400 | 4.6 | " |
| 6 | 1 | 6 | 500 | 18.2 | Comparison |

EXAMPLES (TDI)

Prepolymer 1

Commercially available Vibrathane® 8083 from Uniroyal (TDI prepolymer with an NCO content of 3.4%).

Polyol Component 1

2000 g (1 mol) of polyester diol (Desmophen® 2001 from Bayer) at 60° C. were mixed with 1140 g of molten 4,4'-methylenebis(3-chloro-2,6-diethylaniline/ LONZACURE® MCDEA, LONZA AG). The following additions were then incorporated:

| | |
|---|---|
| 54.0 g (3.0 mol) of water | |
| 25 g of Dabco ® 1028 | (Air Products) |
| 50 g of Dabco ® Crystalline | (Air Products) |
| 4.0 g of Dabco ® LK221E | (Air Products) |

This gives a polyol/diamine/water component with an equivalent weight of 233.8.

Production of test sheets:

The production of the test sheets was based on the Examples (MDI).

Results:

| Example | Pre-polymer No. | Polyol component No. | Density kg/m$^3$ | ΔDVR % | |
|---|---|---|---|---|---|
| 1 | 1 | 1 | 710 | 1.8 | Invention |

What is claimed is:

1. Cellular polyurethane elastomer which can be produced by reacting:
   a) an isocyanate component which includes methylenebis (phenyl isocyanate)(MDI) and/or tolylene diisocyanate (TDI), in monomeric form or as liquefied prepolymer, with
   b) compounds with at least two isocyanate-reactive hydrogen atoms, and
   c) 4,4'-methylenebis(3-chloro-2,6-dialkylaniline) or a mixture of 4,4'-methylenebis-(3-chloro-2,6-dialkylaniline) with one or more aromatic, aliphatic or cycloaliphatic diamines as chain extending agent, optionally with further polyol, and
   d) a blowing agent which is selected from the group consisting of a blowing agent including water and a water-based blowing agent, in the presence of a catalyst and optionally other additives.

2. Cellular polyurethane elastomer according to claim 1, wherein the chain extending agent is used together with a polyol.

3. Cellular polyurethane elastomer according to claim 1, wherein the chain extending agent used is 4,4'-methylenebis (3-chloro-2,6-diethylaniline) or a mixture of 4'4'-methylenebis(3-chloro-2,6-diethylaniline) with one or more aromatic or aliphatic diamines.

4. Cellular polyurethane elastomer according to claim 1, wherein water is used as the blowing agent.

5. Cellular polyurethane elastomer according to claim 2, wherein the chain extending agent used in 4,4'-mehtylenebis (3-chloro-2,6-diethylaniline) or a mixture of 4,4'-methylenebis(3-chloro-2,6-diethylaniline) with one or more aromatic or alipathic diamines.

6. Cellular polyurethane elastomer according to claim 5 wherein water is used as the blowing agent.

7. Process comprising producing decoupling systems or moulding exposed to high dynamic and thermal stresses from the cellular polyurethane elastormer of claim 1.

8. Process comprising producing decoupling systems and moulding exposed to high dynamic and thermal stresses from the cellular polyurethane elastomer of claim 6.

9. Process for preparing cellular polyurethane elastomer, comprising reacting:
   (a) an isocyanate component which includes methylenebis(phenyl isocyanate)(MDI) and/or tolylene diisocyanate (TDI), in monomeric form or as liquefied prepolymer, with (b) compounds with at least two isocyanate-reactive hydrogen atoms, and (c) 4,4'-methylenebis(3-chloro-2,6-dialkylaniline) or a mixture of 4,4'-methylenebis(3-chloro-2,6-dialkylaniline) with one or more aromatic, aliphatic or cyclosliphatic diamines as chain extending agent, optionally with further polyol, and (d) a blowing agent which is selected from the group consisting of a blowing agent which includes water and a water-based blowing agent, in the presence of a catalyst and optionally other additives.

10. Process according to claim 7 wherein the blowing agent is present in an amount from 0.1 to 9 mols, based on 1 mol of chain extender agent, and the polyol component is present in a molar ratio, based on the chain extending agent, of from 0.1:1 to 10:1.

11. Process according to claim 10 wherein the reaction is conducted in a casting process in closed molds.

12. Process according to claim 10 wherein the reaction is conducted in a prepolymer process or a one-shot process.

* * * * *